United States Patent
Scherzinger et al.

(10) Patent No.: US 7,976,285 B2
(45) Date of Patent: Jul. 12, 2011

(54) ELECTRONIC CONTROL FOR HEAVY DUTY TRUCK COMPRESSED AIR CHARGING SYSTEM

(75) Inventors: Ted Scherzinger, Sammamish, WA (US); Christopher Paul Harry, Bellevue, WA (US); Michel Mallett, Seattle, WA (US); Robert Miracle, Heidelberg (DE); Balbir Singh, Renton, WA (US)

(73) Assignee: PACCAR Inc, Bellevue, WA (US)

( * ) Notice: Subject to any disclaimer, the term of this patent is extended or adjusted under 35 U.S.C. 154(b) by 1029 days.

(21) Appl. No.: 11/757,933

(22) Filed: Jun. 4, 2007

(65) Prior Publication Data

US 2007/0277900 A1    Dec. 6, 2007

Related U.S. Application Data

(60) Provisional application No. 60/811,340, filed on Jun. 5, 2006.

(51) Int. Cl.
F04B 43/12 (2006.01)
F04B 49/06 (2006.01)

(52) U.S. Cl. ............................................. 417/53; 417/31

(58) Field of Classification Search ................. 417/53, 417/31; 303/10, 60
See application file for complete search history.

(56) References Cited

U.S. PATENT DOCUMENTS

| 4,459,085 | A | * | 7/1984 | Tonegawa | 417/282 |
| 4,802,456 | A | * | 2/1989 | Okane et al. | 123/564 |
| 5,197,787 | A | * | 3/1993 | Matsuda et al. | 303/10 |
| 5,906,480 | A | | 5/1999 | Sabelstrom | |
| 6,036,449 | A | * | 3/2000 | Nishar et al. | 417/292 |
| 6,292,726 | B1 | * | 9/2001 | Gustavsson | 701/36 |
| 6,682,459 | B1 | | 1/2004 | Knight | |
| 7,344,201 | B1 | * | 3/2008 | Bates | 303/57 |
| 2004/0260441 | A1 | * | 12/2004 | Dussapt et al. | 701/36 |

* cited by examiner

*Primary Examiner* — Devon C Kramer
*Assistant Examiner* — Christopher Bobish
(74) *Attorney, Agent, or Firm* — Christensen O'Connor Johnson Kindness PLLC

(57) ABSTRACT

A method of charging a compressed air storage tank for a vehicle increases the pressure in the storage tank from a first pressure to a second pressure. The method includes determining the first pressure according to a first detected vehicle engine load, and starting the charge cycle when the pressure detected in the storage tank is at least as low as the first pressure. The method further includes determining the second pressure according to a second detected vehicle engine load, and stopping the charge cycle when the pressure detected in the storage tank is at least as high as the second pressure.

12 Claims, 6 Drawing Sheets

ELECTRONIC CONTROL FOR HEAVY DUTY TRUCK COMPRESSED AIR CHARGING SYSTEM

CROSS-REFERENCE(S) TO RELATED APPLICATION(S)

This application claims the benefit of U.S. Provisional Application No. 60/811,340, filed on Jun. 5, 2006, the disclosure of which is expressly incorporated by reference.

BACKGROUND

Many vehicles include pneumatic systems that require compressed air to function. For example, trucks, buses, trailers, and trains use air brakes in which compressed air is supplied to a brake chamber to provide the force required to actuate the brakes. Air suspensions, which use compressed air as a spring to replace the steel springs of a conventional suspension system, are another type of pneumatic system included in some vehicles. Many heavy duty trucks also include air seats and air horns, both of which require a source of compressed air.

Safe and reliable operation of these and other pneumatic systems requires that an adequate supply of compressed air be readily available for use by the systems. To ensure that compressed air is available, atmospheric air is compressed by a compressor and stored in one or more compressed air storage tanks until such air is needed. This supply of compressed air is depleted as compressed air is supplied to the pneumatic systems. A certain amount of the compressed air supply is also lost due to leaks in the pneumatic systems.

The amount of compressed air stored in a storage tank is controlled by regulating the amount of compressed air supplied to the storage tank by the compressor. Typically, a governing mechanism controls the flow of compressed air into the storage tank so that the pressure inside the storage tank is maintained between predetermined maximum and minimum pressures. The maximum pressure is determined based on design considerations involving at least the capacity of the compressor, the governing mechanism, the storage tank, and the pneumatic systems to which the compressed air is supplied. The minimum pressure is generally the pressure required to assure that the pneumatic systems remain operable.

Referring now to FIG. 1, a currently known compressed air charging system 10 includes a compressor 12, a storage tank 14, and a mechanically controlled governor 16. The governor 16 detects the pressure in the storage tank 14 and selectively directs compressed air from the compressor 12 to storage tank 14 based on the storage tank pressure. When the pressure in the storage tank 14 drops below a predetermined lower limit, e.g., 100 psi, a valve in the governor 16 directs the air from the compressor 12 into the storage tank 14 to charge the storage tank 14. When the pressure in the storage tank 14 reaches an upper limit, e.g., 120 psi, the storage tank 14 is fully charged, and the valve in the governor 16 directs air from the compressor 12 through a discharge outlet 18 to the atmosphere.

Compressors of these systems 10 are generally driven by the vehicle engine. When the tank is not being charged, air from the compressor is discharged to the atmosphere, and very little engine power is required to drive the compressor. However, the same compressor may require approximately 4 to 5 horsepower when air from the air compressor is used to charge the storage tank. As a result, charging the storage tank uses engine power that would otherwise be available to the vehicle operator.

Under certain conditions, a driver may require all available engine power. For example, when a truck travels up a grade, the truck generally demands all available power. If the compressor is charging the tank during this time, not all of the engine power is available to power the truck up the grade. Further, because the driver is unlikely to use the brakes while traveling up a grade, it is reasonable to use all available power to move the truck and leave charging the storage tank until a later time, as long as enough pressure is maintained in the storage tank to operate other systems in a safe manner.

SUMMARY

A method of charging a compressed air storage tank for a vehicle is disclosed. The storage tank is charged so that the pressure in the storage tank increases from a first pressure to a second pressure. A first vehicle engine load is detected, and the first pressure is determined according to the first vehicle engine load. A charge cycle is started when the detected pressure in the storage tank equals the first pressure. The second pressure is determined according to a second vehicle engine load. The charge cycle is stopped when the detected pressure in the storage tank equals the second pressure.

Also disclosed is a compressed air charging system for a vehicle. The system includes a compressor, a storage tank, and a valve in fluid communication with the compressor and the storage tank. A microcontroller is in electronic communication with the valve and is adapted to control the valve to selectively direct air from the compressor to the storage tank. The controller controls the valve to charge the storage tank from a first pressure to a second pressure. The first pressure is determined according to a first vehicle engine load, and the second pressure is determined according to a second vehicle engine load.

A method for setting starting and ending storage tank pressures for a charge cycle of a compressed air charging system for a vehicle is also disclosed. The method includes setting the starting storage tank pressure according to an availability of excess engine power when the storage tank pressure is between a maximum low-limit pressure and a minimum low-limit pressure, inclusive. The method further includes setting the ending storage tank pressure according to an availability of excess power when the storage tank pressure is between a minimum high-limit pressure and a maximum high-limit pressure, inclusive.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
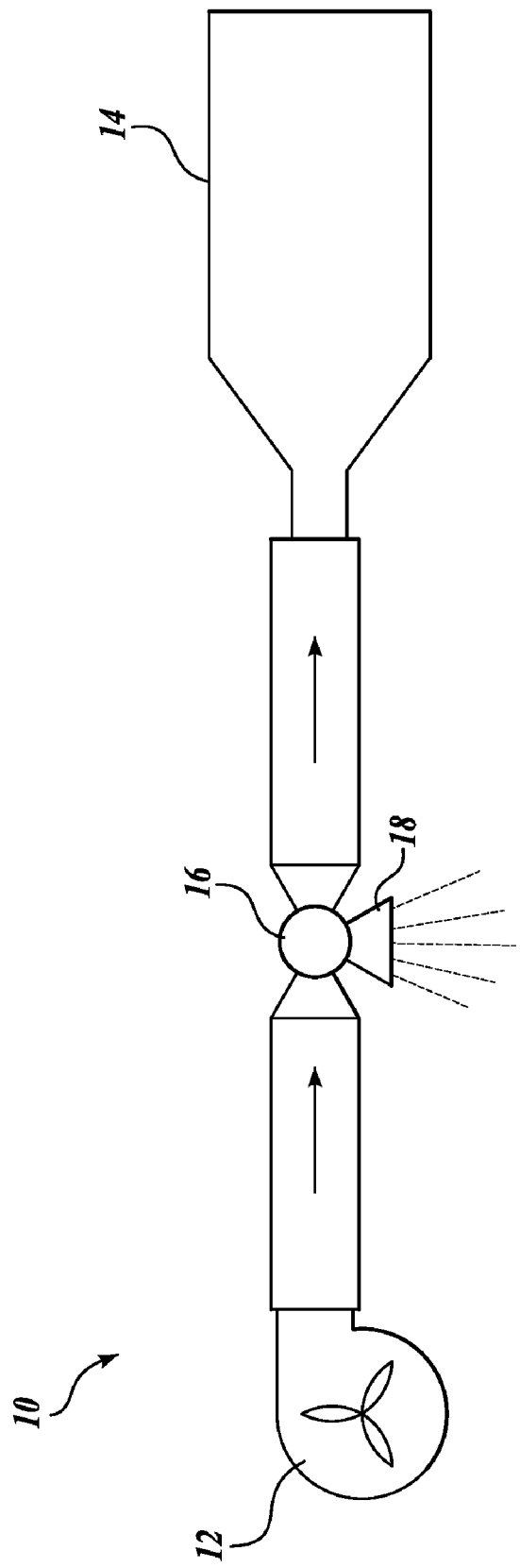
FIG. 1 is a schematic diagram of a known compressed air charging system.
Figure 2:
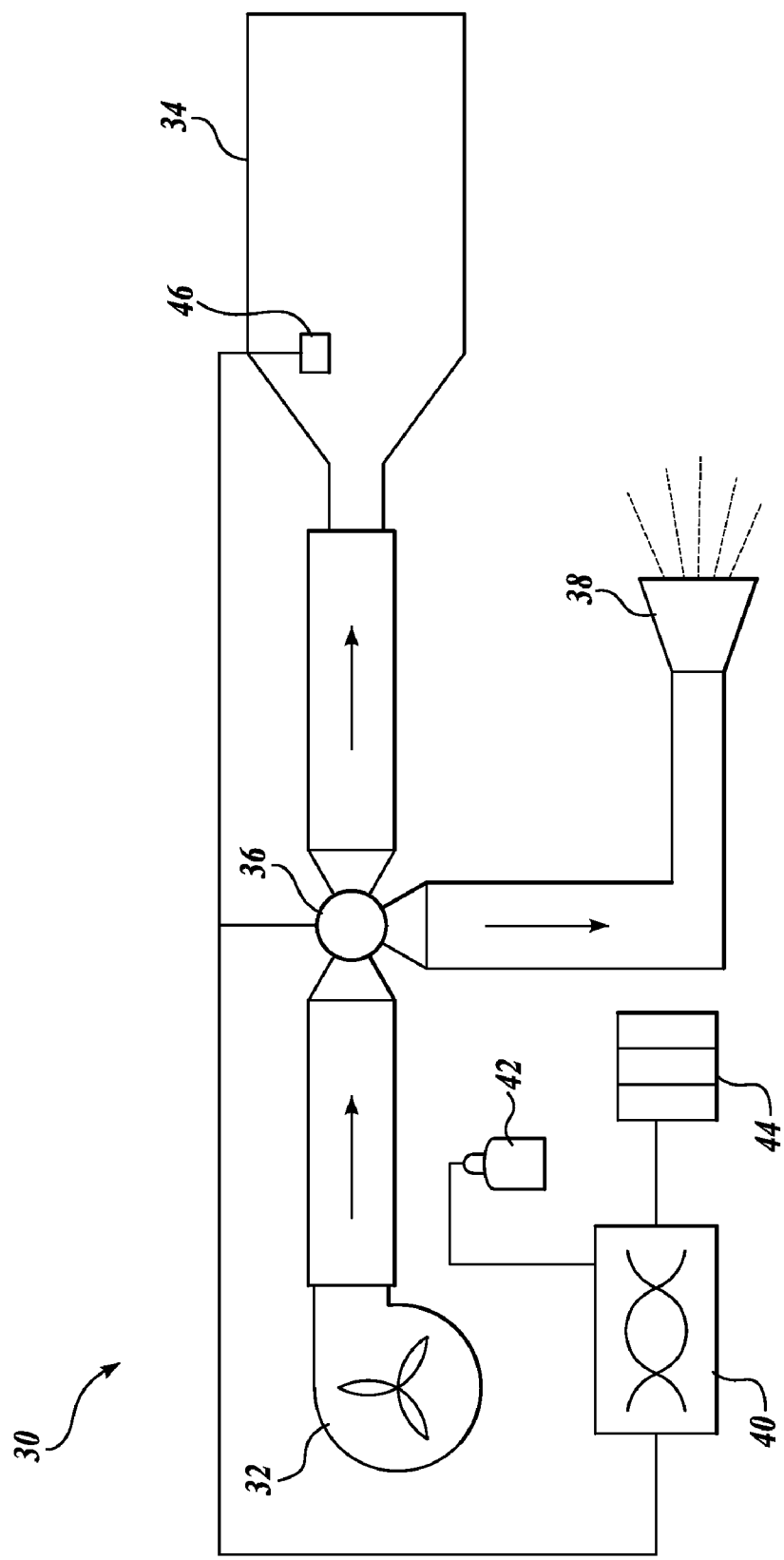
FIG. 2 is a schematic diagram of an exemplary embodiment of an electronically controlled compressed air charging system constructed in accordance with aspects of the present disclosure.

FIG. 2 shows an exemplary embodiment of a compressed air charging system 30 suitable for use on a vehicle having one or more pneumatic systems. Generally described, the charging system 30 includes a compressor 32, a control valve 36, an outlet 38, and a storage tank 34. The compressor 32 is mechanically coupled to the vehicle engine (not shown) so that the engine provides power to drive the compressor 32. The compressor 32 receives air from an air source and outputs compressed air, which is available to charge the storage tank 34. In use, the compressed air from the storage tank 34 is used by the one or more vehicle pneumatic systems.

As shown in the embodiment of FIG. 2, the control valve 36 is in fluid communication with the compressor 32, the outlet 38, and the storage tank 34 so that the control valve 36 selectively directs compressed air provided by the compressor 32 to either the storage tank 34 or to the outlet 38. When the control valve 36 is in a first position, compressed air from the air compressor 32 is directed to the storage tank 34 to charge the storage tank 36. When the valve 36 is in a second position, compressed air from the air compressor 32 is directed to the outlet 38, which vents the compressed air to the atmosphere.

One such control valve 36 that may be practiced with the system 30 is a solenoid control valve, although other electronically control valves with the appropriate functionality may be employed. The control valve 36 is in electrical communication with a controller, such as a microprocessor, and receives control signals therefrom. In the illustrated embodiment, the microprocessor is a central electronic control unit 40 (CECU). It should be understood that the microprocessor may be any suitable multiplexed microprocessor already installed on the vehicle. Alternately, the microprocessor may be dedicated to operation of the compressed air charging system 30.

The CECU 40 is also in electronic communication with one or more sensors that detect operating parameters of the vehicle and the charging system 30 components. The sensors transmit detected parameters to the CECU 40, which controls the charging of the storage tank 34 according to one or more of the detected vehicle operating conditions and/or the amount of compressed air stored in the storage tank 34.

In use, the CECU 40 receives signals regarding various vehicle operating conditions and determines whether excess engine power is available based on the received signals. The embodiment of a compressed air charging system 30 shown in FIG. 2 includes a brake pedal switch 42 and an engine torque monitor 44 capable of sending indications of specified vehicle operating conditions to the CECU 40. Based on the signals received from, for example, the brake pedal switch 42 and/or the engine torque monitor 44, the CECU 40 determines if operating conditions are such that the vehicle operator requires or is likely to require all available engine power. If the vehicle operator does not require and is not likely to require all available engine power, then excess engine power is available to drive the compressed air charging system 30. It should be understood that the vehicle sensors used to detect vehicle operating conditions are not limited to the illustrated brake pedal switch 42 and engine torque monitor 44. Alternate embodiments may include other types of sensors including, but not limited to, sensors for detecting throttle position, percent engine torque, brake application pressure, engine brake status, and any other information suitable for determining the operating conditions of the vehicle. Existing vehicle sensors may also be used to determine vehicle operating conditions. These sensors include, but are not limited to, sensors that are part of the Engine Control Unit (ECU) or anti-lock braking system (ABS), or existing sensors that are directly wired to the engine.

Still referring to FIG. 2, a pressure sensor 46 is associated with the storage tank 34 to monitor the air pressure within the storage tank 34 and to communicate the detected pressure to the CECU 40. The pressure in the tank provides an indication of the amount of charged air stored in the storage tank 34. In the illustrated embodiment, the pressure sensor 46 is a known pressure sensor disposed within the storage tank 34. It should be understood that alternate embodiments can include other types of pressure sensors, such as strain gages mounted to an outside surface of the storage tank 34 or any other sensor suitable for sensing the pressure in a closed vessel.

In operation, the CECU 40 determines when to begin and end a compressed air system charging cycle based on the signals received from the associated sensors. More specifically, the CECU 40 determines a low-limit tank pressure and a high-limit tank pressure. The low-limit tank pressure is the pressure at which a tank charging cycle begins, and the high-limit tank pressure is the pressure at which the charging cycle ends. Each of the low-limit tank pressure and the high-limit tank pressure has a maximum value and a minimum value.

The CECU 40 determines the low-limit tank pressure so that a charge cycle begins when the pressure in the storage tank 34 is at or below a predetermined value, which is defined as the maximum low-limit tank pressure. If the CECU 40 determines that excess engine power is available when the pressure drops to the maximum low-limit tank pressure, then the CECU 40 initiates a charging cycle. The charging cycle begins when the CECU 40 sends a signal the control valve 36 to move from the second position, in which compressed air from the air compressor 32 is directed to the outlet 38, to the first position, in which compressed air from the air compressor 32 is directed to the storage tank 34.

If the CECU 40 determines that excess engine power is not available when the pressure in the storage tank 34 drops to the maximum low-limit tank pressure, then the CECU 40 does not initiate a charge cycle at that time. Instead, the pressure continues to drop until the CECU 40 determines that excess engine power is available, at which time the CECU 40 initiates a charging cycle. If the pressure drops to the minimum low-limit tank pressure, then CECU 40 initiates a charging cycle without regard to whether or not excess engine power is available. The minimum low-limit tank pressure is a predetermined minimum pressure value that is preferably chosen at a level to ensure that an adequate supply of compressed air is available for the systems that rely upon compressed air for safe operation.

Once a charge cycle has started, the control valve 36 continues to direct compressed air from the compressor 32 to the storage tank 34 until the pressure in the tank 34 reaches, for example, a predetermined value. This predetermined value, which defines the minimum high-limit tank pressure, is the minimum pressure to which a storage tank 34 will be charged by a charging cycle. If the CECU 40 determines that no excess engine power is available when the pressure in the storage tank 34 reaches the minimum high-limit tank pressure, then the CECU 40 ends the charging cycle by sending a signal the control valve 36 to move from the first position, in which compressed air from the air compressor 32 is directed to the storage tank 34, to the second position, in which compressed air from the air compressor 32 is directed to the outlet 38.

If, however, the CECU 40 determines that excess engine power is available when the pressure in the storage tank 34 reaches the minimum high-limit tank pressure, then the charging cycle continues until the CECU 40 determines that excess engine power is no longer available. Once the CECU 40 has determined that excess engine power is no longer available, the CECU 40 ends the charging cycle by sending a signal the control valve 36 to move from the first position to the second position, directing the compressed air from the air compressor 32 to the outlet 38 instead of the storage tank 34.

If the pressure inside the storage tank 34 reaches a predetermined value that is higher than the minimum high-limit tank pressure, then the CECU 40 ends the charging cycle without regard to whether or not excess engine power is available. This predetermined value that is higher than the minimum high-limit tank pressure is defined as the maximum high-limit tank pressure and is chosen according to at least the capabilities of the compressor 32, the storage tank 34, and the rest of the components of the compressed air charging system.

Figure 3:
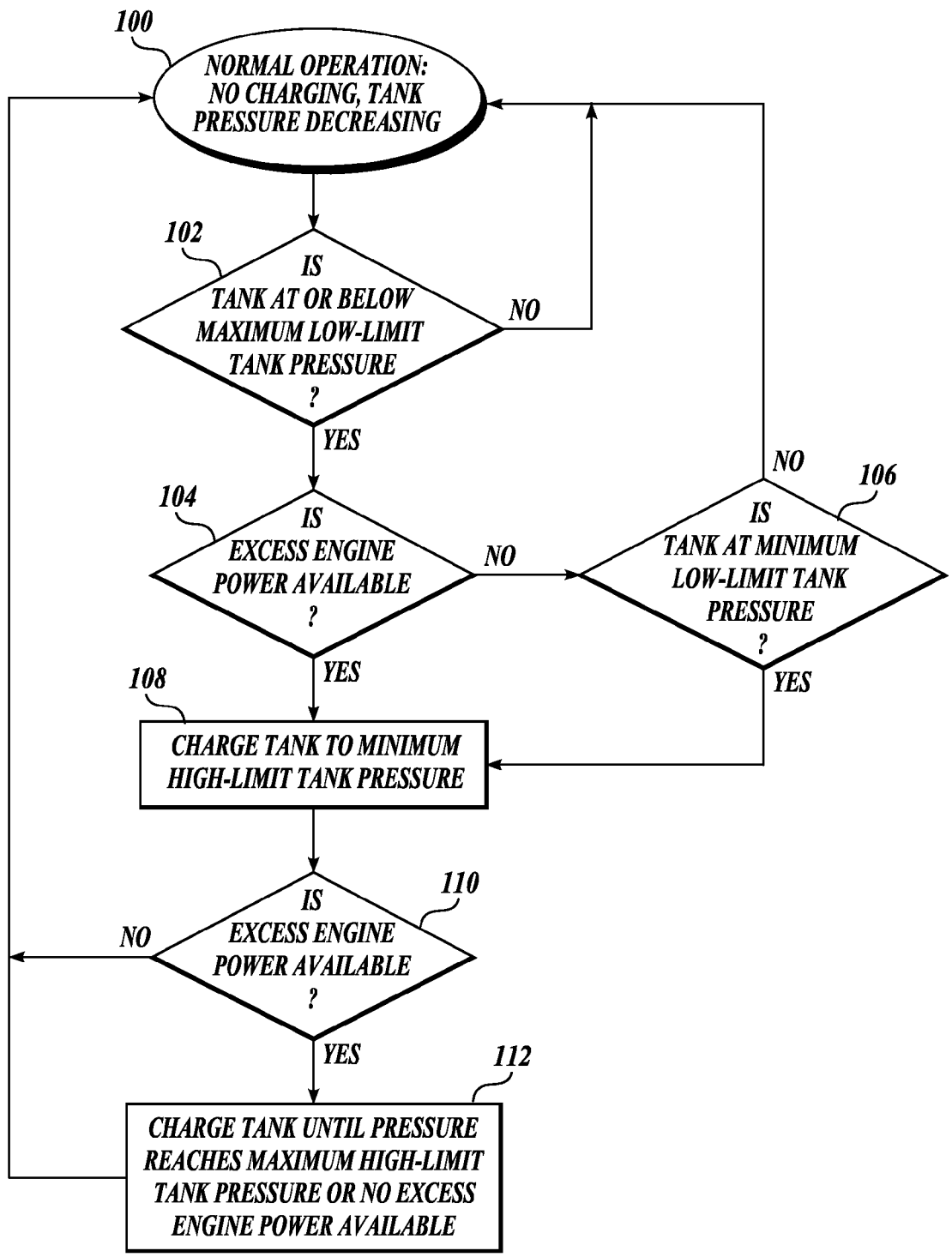
FIG. 3 is a flow chart of one exemplary method of charging a compressed air storage tank using the compressed air charging system of FIG. 2.

FIG. 3 shows a block diagram of one such process for electronically controlling the compressed air charging system 30. The process begins under normal operating conditions at block 100, during which the storage tank 34 is not being charged, and the pressure in the storage tank 34 is decreasing. The CECU 40 monitors, at block 102, the pressure in the storage tank 34 and determines whether the pressure is at or below the maximum low-limit tank pressure. If the pressure in the tank is above the maximum low-limit tank pressure, then no action is taken.

If the pressure in the tank 34 is at or below the maximum low-limit tank pressure, then the CECU 40 determines if excess engine power is available at block 104. If no excess engine power is available and it is determined at block 106 that the tank 34 is not at the minimum low-limit tank pressure, then the process proceeds to block 100, where no action is taken. If, in addition to no excess engine power being available, it is determined at block 106 that the tank 34 is at the low-limit tank pressure, then the tank 34 is charged to the minimum high-limit tank pressure at block 108. On the other hand, if excess engine power is available at block 104, then the tank 34 is charged to the minimum high-limit tank pressure at block 108.

Still referring to FIG. 3, after the storage tank 34 is charged to the minimum high-limit tank pressure at block 108, the CECU 40 determines if excess engine power is available at block 110. If no excess engine power is available at block 110, then charging cycle ends, and the vehicle returns to normal operation at block 100. If, however, the CECU 40 determines that excess engine power is available at block 110, then the charging cycle continues at block 112 until excess engine power is no longer available, or the pressure in the storage tank 34 reaches the maximum high-limit tank pressure.

Figure 4:
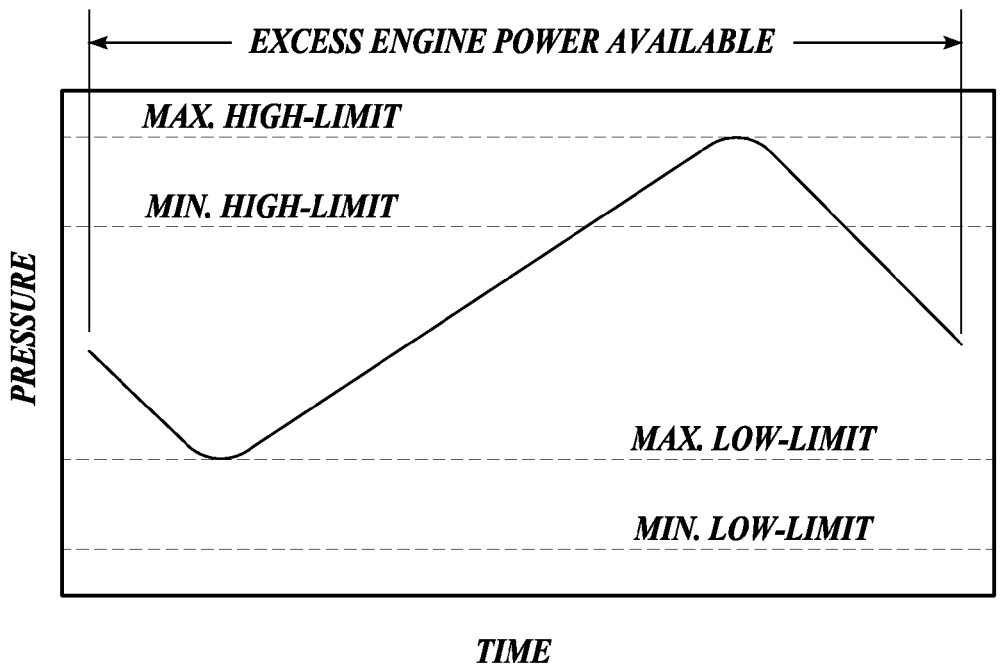
FIG. 4 is a graph illustrating a first charging cycle of the compressed air charging system of FIG. 2.

FIGS. 4-8 illustrate the changes in storage tank pressure for several exemplary charge cycles. FIG. 4 shows a charge cycle wherein excess engine power is available throughout the entire charging cycle. The pressure in the storage tank 34 drops until it reaches the maximum low-limit tank pressure. The CECU 40 initiates the charging cycle by directing compressed air from the air compressor 32 to the storage tank 34 until the pressure in the storage tank 34 reaches the maximum high-limit tank pressure. The charging cycle ends when the pressure reaches the maximum high-limit tank pressure.

Figure 5:
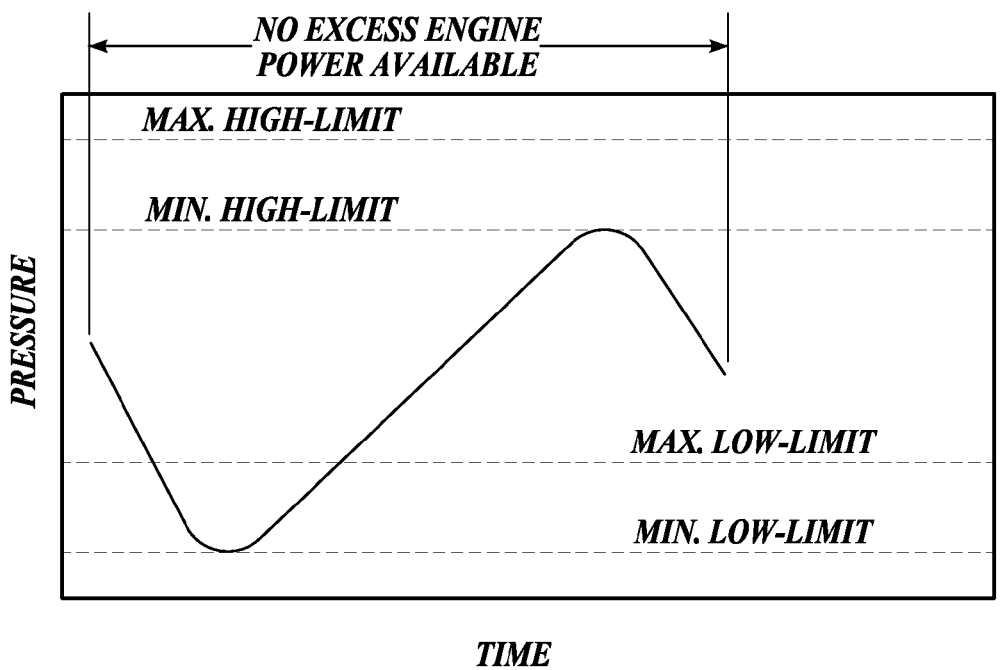
FIG. 5 is a graph illustrating a second charging cycle of the compressed air charging system of FIG. 2.

FIG. 5 shows a charge cycle wherein no excess engine power is available throughout the entire charging cycle. The pressure in the storage tank 34 drops until it reaches the minimum low-limit tank pressure. The CECU 40 initiates the charging cycle and raises the pressure in the storage tank 34 until the pressure in the storage tank 34 reaches the minimum high-limit tank pressure. Because no excess power is available, the charge cycle ends.

Figure 6:
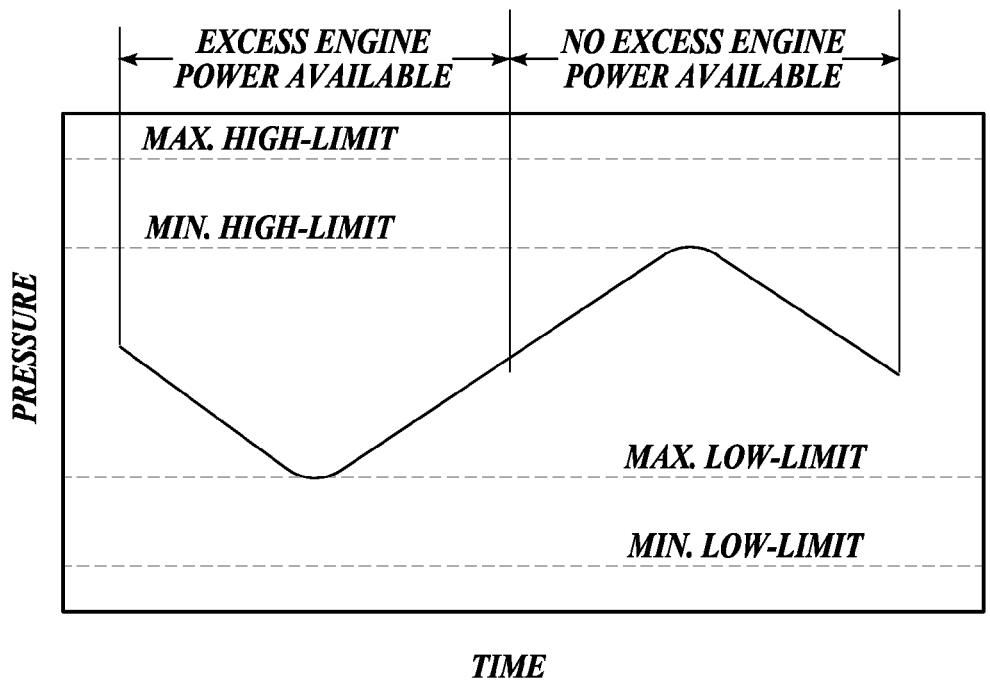
FIG. 6 is a graph illustrating a third charging cycle of the compressed air charging system of FIG. 2.

FIG. 6 shows a charge cycle wherein excess engine power is available at the beginning of the charge cycle, but not at the end of the charge cycle. The pressure in the storage tank 34 drops until it reaches the maximum low-limit tank pressure. The CECU 40 initiates the charging cycle and raises the pressure in the storage tank 34 until the pressure in the storage tank 34 reaches the minimum high-limit tank pressure. Because no excess power is available, the charge cycle ends.

Figure 7:
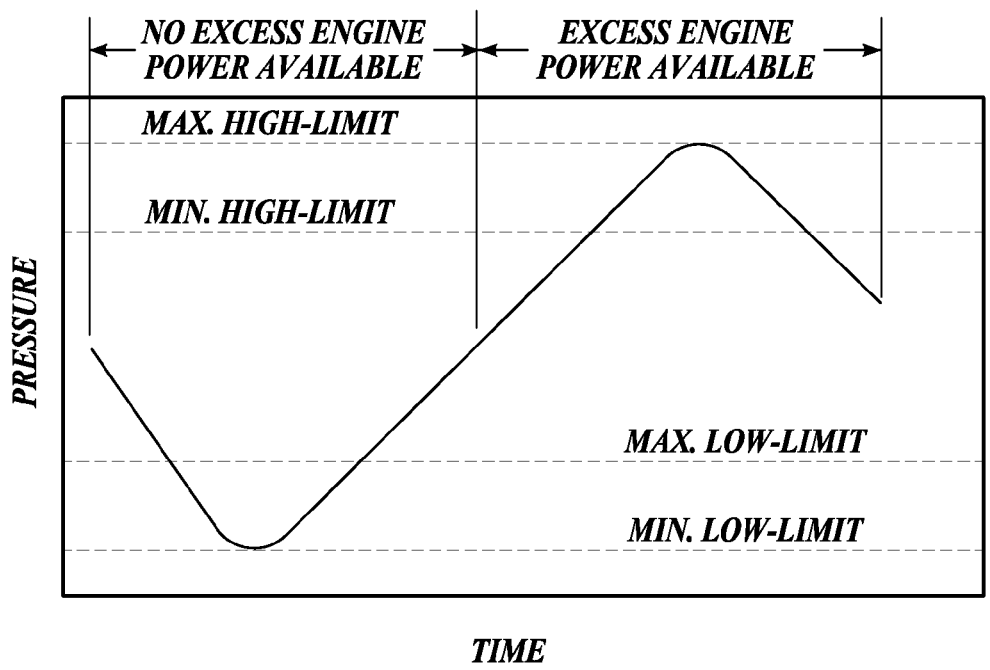
FIG. 7 is a graph illustrating a fourth charging cycle of the compressed air charging system of FIG. 2.

FIG. 7 shows a charge air cycle wherein excess engine power is available at the end of the charge cycle, but not at the beginning of the charge cycle. The pressure in the storage tank 34 drops until it reaches the minimum low-limit tank pressure. The CECU 40 initiates the charging cycle and raises the pressure in the storage tank 34 until the pressure in the storage tank 34 reaches the maximum high-limit tank pressure, at which point the charging cycle ends.

Figure 8:
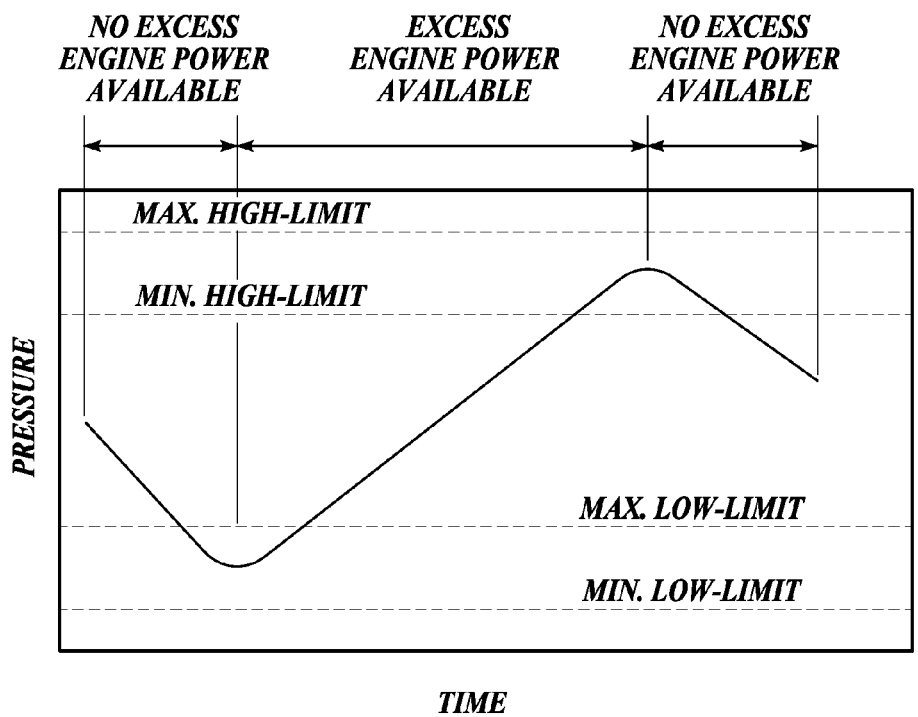
FIG. 8 is a graph illustrating a fifth charging cycle of the compressed air charging system of FIG. 2.

FIG. 8 shows a charge air cycle during which excess engine power becomes available after the pressure in the storage tank 34 drops below the maximum low-limit tank pressure, but before the pressure reaches the minimum low-limit tank pressure. The excess engine power remains available until after the storage tank 34 has been charged to a pressure greater than the minimum high-limit tank pressure, but ceases to be available before the pressure in the storage tank 34 reaches the maximum high-limit tank pressure. In the illustrated charge air cycle, the CECU 40 initiates the charging cycle when excess engine power becomes available and ends the charging cycle when excess power ceases to be available.

Significantly larger pressure ranges can be safely implemented by the systems described herein because the CECU will monitor truck operational parameters, such as engine and brake usage, and/or tank pressure, to determine the most suitable upper and lower pressure limits at any given time. For example, while known compressed air charging systems may have minimum and maximum pressures of 100 psi and 120 psi, respectively, embodiments of the air charging system 30 may have minimum and maximum pressures of, for example, 90 psi and 130 psi, respectively. More specifically, the minimum low-limit tank pressure may be 90 psi, and the maximum low level tank pressure may be 100 psi. Further, the minimum high-limit tank pressure may be 120 psi, and the maximum high level tank pressure may be 130 psi. Thus, the system 30 is capable of operating over a greater range of pressures than currently known systems.

While illustrative embodiments have been illustrated and described, it will be appreciated that various changes can be made therein without departing from the spirit and scope of the invention as claimed.

The invention claimed is:

1. A method of charging a compressed air storage tank for a vehicle so that a detected pressure in the storage tank increases from a first pressure to a second pressure, said method comprising:

determining the first pressure according to a first detected vehicle engine load, wherein the first pressure is in a range from a minimum low-limit pressure to a maximum low-limit pressure, wherein determining the first pressure comprises:
  (a) determining if excess engine power is available from the first detected vehicle engine load; and
  (b) setting the first pressure, wherein setting the first pressure comprises:
    (i) setting the first pressure to the maximum low-limit pressure if excess engine power is available and the pressure detected in the storage tank is equal to the maximum low-limit pressure;
    (ii) setting the first pressure to a pressure at which excess engine power becomes available if the pressure detected in the storage tank is less than the maximum low-limit pressure and greater than the minimum low-limit pressure; and
    (iii) setting the first pressure to the minimum low-limit pressure if the detected pressure in the storage tank is equal to the minimum low-limit pressure;
starting a charge cycle when the pressure detected in the storage tank is at least as low as the first pressure;
charging the compressed air storage tank to increase the detected pressure from the maximum low-limit pressure to a minimum high-limit pressure;
determining the second pressure according to a second detected vehicle engine load, wherein the second pressure is in a range from the minimum high-limit pressure to a maximum high-limit pressure; and
stopping the charge cycle when the pressure detected in the storage tank is at least as high as the second pressure.

2. The method of claim 1, wherein the maximum low-limit pressure is 100 psi.

3. The method of claim 1, wherein the minimum low-limit pressure is 90 psi.

4. A method of charging a compressed air storage tank for a vehicle so that a detected pressure in the storage tank increases from a first pressure to a second pressure, said method comprising:
determining the first pressure according to a first detected vehicle engine load, wherein the first pressure is in a range from a minimum low-limit pressure to a maximum low-limit pressure;
starting a charge cycle when the pressure detected in the storage tank is at least as low as the first pressure;
charging the compressed air storage tank to increase the detected pressure from the maximum low-limit pressure to a minimum high-limit pressure;
determining the second pressure according to a second detected vehicle engine load, wherein the second pressure is in a range from the minimum high-limit pressure to a maximum high-limit pressure, wherein determining the second pressure comprises:
  (a) determining if excess engine power is available from the second detected vehicle engine load;
  (b) setting the second pressure, wherein setting the first pressure comprises:
    (i) setting the second pressure to the minimum high-limit pressure if no excess engine power is available and the pressure detected in the storage tank is equal to the minimum high-limit pressure;
    (ii) setting the second pressure to a pressure at which excess engine power ceases to be available if the pressure detected in the storage tank is greater than the minimum high-limit pressure and less than the maximum high-limit pressure; and
    (iii) setting the second pressure to the maximum high-limit pressure if the pressure detected in the storage tank is equal to the maximum high-limit pressure; and
stopping the charge cycle when the pressure detected in the storage tank is at least as high as the second pressure.

5. The method of claim 4, wherein the minimum high-limit pressure is 120 psi.

6. The method of claim 4, wherein the maximum high-limit pressure is 130 psi.

7. A method of setting a starting storage tank pressure and an ending storage tank pressure for a charge cycle of a compressed air charging system for a vehicle, the method comprising:
setting the starting storage tank pressure of the charge cycle according to an availability of excess engine power when the storage tank pressure is between a maximum low-limit pressure and a minimum low-limit pressure, inclusive, wherein:
  (a) the starting storage tank pressure is the maximum low-limit pressure if excess engine power is available, and the storage tank pressure is equal to the maximum low-limit pressure;
  (b) the starting storage tank pressure is the tank pressure at which excess engine power becomes available if the storage tank pressure is less than the maximum low-limit pressure and greater than the minimum low-limit pressure; and
  (c) the starting storage tank pressure is the minimum low-limit pressure if the storage tank pressure is equal to the minimum low-limit pressure;
charging the compressed air storage tank to increase the storage tank pressure from the maximum low-limit pressure to a minimum high-limit pressure; and
setting the ending storage tank pressure of the charge cycle according to an availability of excess engine power when the storage tank pressure is between the minimum high-limit pressure and a maximum high-limit pressure, inclusive.

8. The method of claim 7, wherein the maximum low-limit pressure is 100 psi.

9. The method of claim 7, wherein the minimum low-limit pressure is 90 psi.

10. A method of setting a starting storage tank pressure and an ending storage tank pressure for a charge cycle of a compressed air charging system for a vehicle, the method comprising:
setting the starting storage tank pressure of the charge cycle according to an availability of excess engine power when the storage tank pressure is between a maximum low-limit pressure and a minimum low-limit pressure, inclusive;
charging the compressed air storage tank to increase the storage tank pressure from the maximum low-limit pressure to a minimum high-limit pressure; and
setting the ending storage tank pressure of the charge cycle according to an availability of excess engine power when the storage tank pressure is between the minimum high-limit pressure and a maximum high-limit pressure, inclusive, wherein:
  (a) the ending storage tank pressure is the minimum high-limit pressure if no excess engine power is available, and the storage tank pressure is equal to the minimum high-limit pressure during the charging cycle;
  (b) the ending storage tank pressure is the tank pressure at which excess engine power ceases to be available if the storage tank pressure is greater than the minimum high-limit pressure and less than the maximum high-limit pressure; and (c) the ending storage tank pressure is the maximum high-limit pressure if the storage tank pressure equals the maximum high-limit pressure.

11. The method of claim 10, wherein the minimum high-limit pressure is 120 psi.

12. The method of claim 10, wherein the maximum high-limit pressure is 130 psi.

* * * * *